(12) United States Patent
Kim et al.

(10) Patent No.: US 11,079,527 B2
(45) Date of Patent: Aug. 3, 2021

(54) DISPLAY DEVICE INCLUDING COVER WINDOW WITH FLAT SIDE SURFACES

(71) Applicant: SAMSUNG DISPLAY CO., LTD., Yongin-si (KR)

(72) Inventors: Min Seop Kim, Yongin-si (KR); Soon Sung Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/374,148

(22) Filed: Apr. 3, 2019

(65) Prior Publication Data

US 2019/0227212 A1 Jul. 25, 2019

Related U.S. Application Data

(62) Division of application No. 14/716,499, filed on May 19, 2015, now Pat. No. 10,274,658.

(30) Foreign Application Priority Data

Feb. 2, 2015 (KR) ........................ 10-2015-0015991

(51) Int. Cl.
*G02B 5/30* (2006.01)
*G06F 1/16* (2006.01)

(52) U.S. Cl.
CPC ......... *G02B 5/3033* (2013.01); *G06F 1/1658* (2013.01); *G06F 1/1684* (2013.01)

(58) Field of Classification Search
CPC combination set(s) only.
See application file for complete search history.

(56) References Cited

U.S. PATENT DOCUMENTS

| | | | |
|---|---|---|---|
| 5,870,160 A * | 2/1999 | Yanagawa | G02F 1/134363 349/141 |
| 6,359,668 B1 * | 3/2002 | Iijima | G02F 1/133536 349/162 |
| 9,274,360 B2 | 3/2016 | Oh et al. | |
| 10,076,890 B2 | 9/2018 | Oh et al. | |

(Continued)

FOREIGN PATENT DOCUMENTS

| JP | 2014-106425 | 6/2014 |
|---|---|---|
| KR | 10-2013-0054551 A | 5/2013 |

(Continued)

OTHER PUBLICATIONS

Korean Office Action with English translation for Korean Patent Application No. 10-2015-0015991 dated Nov. 25, 2020.

*Primary Examiner* — Lauren Nguyen
(74) *Attorney, Agent, or Firm* — Kile Park Reed & Houtteman PLLC

(57) ABSTRACT

A display device including a housing including sidewalls and mounting surfaces at upper ends of the sidewalls; a display panel housed in the housing; and a cover window on the display panel, wherein the cover window includes an upper surface that faces outwardly in a direction in which light is emitted, a lower surface opposite to the upper surface, the lower surface being narrower than the upper surface, and side surfaces that slope inwardly from ends of the upper surface to ends of the lower surface, the side surfaces being at least partially bent, and wherein the side surfaces of the cover window are mounted on the mounting surfaces of the housing.

10 Claims, 7 Drawing Sheets

(56) References Cited

U.S. PATENT DOCUMENTS

| | | | |
|---|---|---|---|
| 2006/0007054 A1* | 1/2006 | Chang | G02F 1/13336 345/1.3 |
| 2011/0102302 A1 | 5/2011 | Watanabe et al. | |
| 2012/0133859 A1* | 5/2012 | Cha | G02F 1/133528 349/61 |
| 2012/0200805 A1* | 8/2012 | Harayama | G02F 1/133512 349/62 |
| 2014/0063705 A1 | 3/2014 | Song | |
| 2014/0217866 A1 | 8/2014 | Harris | |

FOREIGN PATENT DOCUMENTS

| | | |
|---|---|---|
| KR | 10-2013-0060885 | 6/2013 |
| KR | 10-2013-0105973 A | 9/2013 |
| KR | 10-2013-0113155 A | 10/2013 |
| KR | 10-2014-0031491 | 3/2014 |

* cited by examiner

DISPLAY DEVICE INCLUDING COVER WINDOW WITH FLAT SIDE SURFACES

CROSS-REFERENCE TO RELATED APPLICATION

This is a divisional application based on pending application Ser. No. 14/716,499, filed May 19, 2015, the entire contents of which is hereby incorporated by reference.

Korean Patent Application No. 10-2015-0015991, filed on Feb. 2, 2015, in the Korean Intellectual Property Office, and entitled: "Display Device," is incorporated by reference herein in its entirety.

BACKGROUND

1. Field

Embodiments relate to a display device.

2. Description of the Related Art

A display device may include a cover window bonded to the front of a housing thereof. To bond the housing and the cover window together, the cover window may be attached onto a flat mounting surface on the periphery of the housing.

SUMMARY

Embodiments are directed to a display device.

The embodiments may be realized by providing a display device including a housing including sidewalls and mounting surfaces at upper ends of the sidewalls; a display panel housed in the housing; and a cover window on the display panel, wherein the cover window includes an upper surface that faces outwardly in a direction in which light is emitted, a lower surface opposite to the upper surface, the lower surface being narrower than the upper surface, and side surfaces that slope inwardly from ends of the upper surface to ends of the lower surface, the side surfaces being at least partially bent, and wherein the side surfaces of the cover window are mounted on the mounting surfaces of the housing.

The display device may further include a polarizing plate between the display panel and the cover window.

A thickness of the cover window may increase from an outer side thereof toward an interior thereof.

A radius of curvature of each of the side surfaces maybe reduced from an outer side thereof toward an interior of the cover window.

The display device may further include a first adhesive layer between the cover window and the display panel.

The first adhesive layer may include an optically clear adhesive.

The display device may further include a cushion member between a lower surface of the display panel and an inner surface of the housing.

The mounting surfaces may complement the side surfaces.

The display device may further include a second adhesive layer between the mounting surfaces and the side surfaces.

The embodiments may be realized by providing a display device including a housing that comprises sidewalls and mounting surfaces at upper ends of the sidewalls; a display panel housed in the housing; and a cover window on the display panel, wherein the cover window includes an upper surface that faces outwardly in a direction in which light is emitted, a lower surface opposite to the upper surface, the lower surface being narrower than the upper surface, and side surfaces that slope inwardly from ends of the upper surface to ends of the lower surface, the side surfaces being at least partially flat, and wherein the side surfaces of the cover window are mounted on the mounting surfaces of the housing.

The display device may further include a polarizing plate between the display panel and the cover window.

Each of the side surfaces may include one flat surface.

Each of the side surfaces may include a plurality of flat surfaces.

A thickness of the cover window may increase from an outer side thereof toward an interior thereof.

The display device may further include a first adhesive layer between the cover window and the display panel.

The first adhesive layer may include an optically clear adhesive.

The display device may further include a cushion member between a lower surface of the display panel and an inner surface of the housing.

The mounting surfaces may complement the side surfaces.

The display device may further include a second adhesive layer between the mounting surfaces and the side surfaces.

Each of the side surfaces may include a curved area and a flat area.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
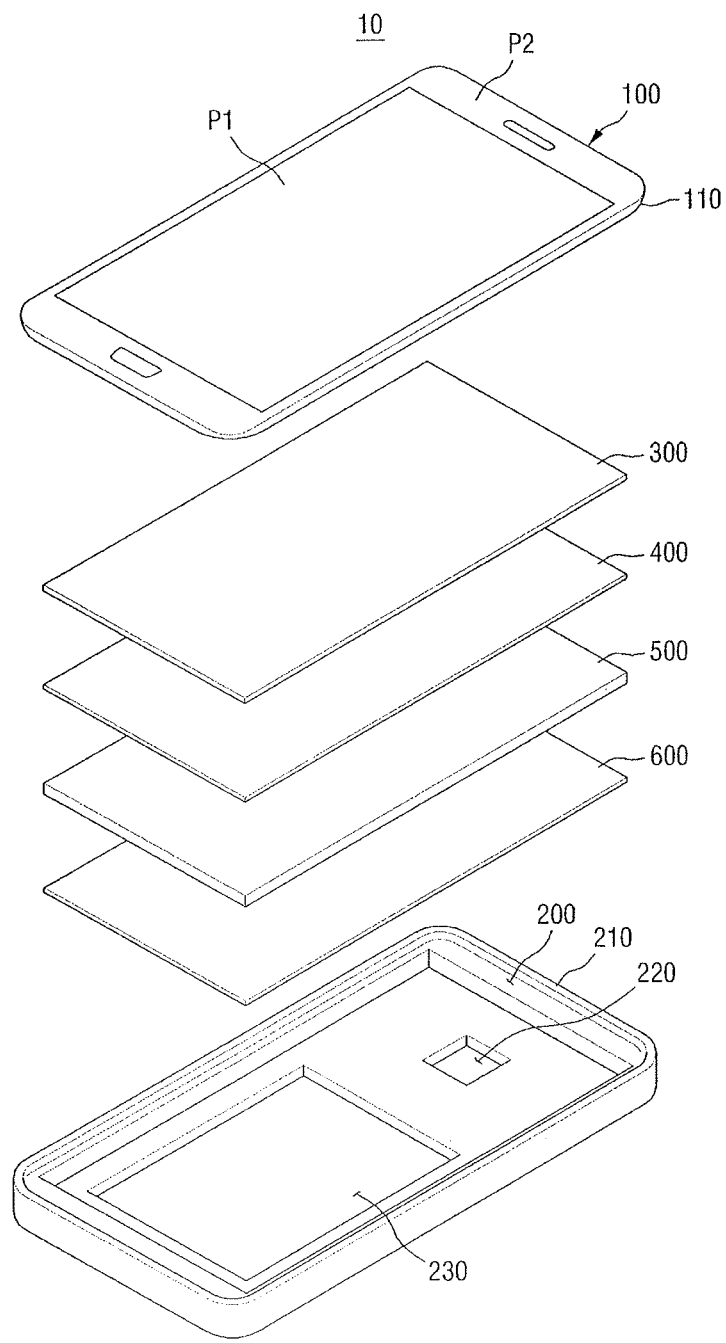
FIG. 1 illustrates an exploded perspective view of a display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present.

Figure 2:
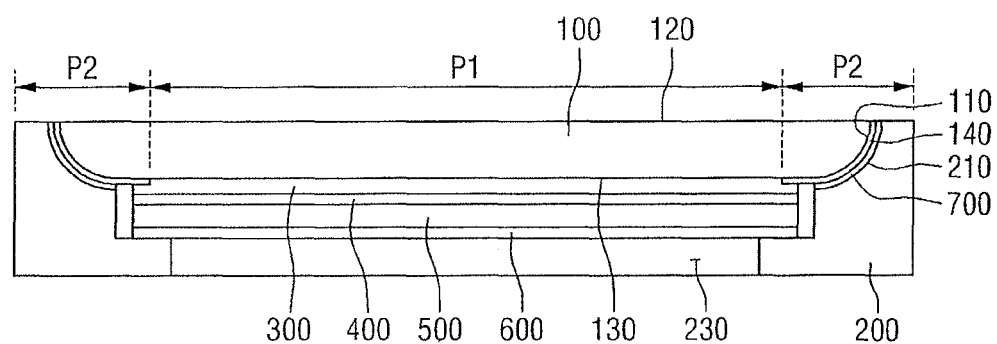
FIG. 2 illustrates a cross-sectional view of the display device of FIG. 1.

FIG. 1 illustrates an exploded perspective view of a display device 10 according to an embodiment. FIG. 2 illustrates a cross-sectional view of the display device 10 of FIG. 1.

Referring to FIGS. 1 and 2, the display device 10 according to the current embodiment may include a cover window 100, a housing 200, a first adhesive layer 300, a polarizing plate 400, a display panel 500, a cushion member 600, and a second adhesive layer 700.

The cover window 100 may be placed in a direction or position in which an image is output from the display device 10. The cover window 100 may include a display area P1 (that transmits light to display an image) and a non-display area P2 (that surrounds the display area P1 and blocks light to not display an image).

The cover window 100 may include a lower (e.g., inner) surface 130 upon which light emitted from the display panel 500 is incident, an upper (e.g., outer) surface 120 from which light transmitting through the cover window 100 exits, and side surfaces 110 that surround sides of the cover window 100 at edges of the upper and lower surfaces 120 and 130.

The upper and lower surfaces 120 and 130 of the cover window 100 may be flat and parallel to each other. The lower surface 130 may be overlapped by the upper surface 120. For example, the upper surface 120 may be wider than the lower surface 130. The upper surface 120 may include portions that extend laterally beyond the lower surface 130. Ends of the upper surface 120 may be located further out than ends of the lower surface 130. The side surfaces 110 may connect the ends of the upper surface 120 and the ends of the lower surface 130, respectively. The upper surface 120 may be wider than the lower surface 130, and the side surfaces 110 may slope downwardly or inwardly from the upper surface 120 toward the lower surface 130.

Each of the side surfaces 110 may include a curved surface. For example, the whole of each of the side surfaces 110 may be curved. A thickness of the cover window 100 around each of the side surfaces 110 may be increased from the outside of the cover window 100 toward the inside.

In an implementation, as illustrated in the drawings, each of the side surfaces 110 may have a fixed or constant radius of curvature. In an implementation, each of the side surfaces 110 may have a variable radius of curvature. For example, the radius of curvature of each of the side surfaces 110 may be reduced from the outside toward the inside.

The side surfaces 110 of the cover window 100 may be used as adhesion surfaces for attaching the cover window 100 to the housing 200. If each of the side surfaces 110 of the cover window 100 is at least partially curved, the surface area of the adhesion surface may increase. The increased surface area may be advantageous in securing a wide adhesion area to the housing 200. Therefore, it is possible to reduce a (e.g., size of a) dead space while maintaining the adhesion area.

The cover window 100 may contain or include various types of materials. In an implementation, the cover window 100 may include, e.g., a glass material or a plastic material.

The display device 10 may further include a printing layer 140 on the cover window 100. The printing layer 140 may be disposed on the non-display area P2 of the cover window 100. The printing layer 140 may cover an entire surface of the non-display area P2 and may expose the display area P1. Therefore, the printing layer 140 may serve as a basis for distinguishing between the display area P1 and the non-display area P2 of the cover window 100.

The printing layer 140 may be disposed on the side surfaces 110 of the cover window 100. In an implementation, the printing layer 140 may extend from the side surfaces 110 of the cover window 100 to the lower surface 130. In an implementation, the printing layer 140 may be disposed on the upper surface 120 of the cover window 100 to absorb or reflect light incident from above the cover window 100. In an implementation, a first printing layer may be disposed on the side surfaces 110 and/or the lower surface 130 of the cover window 100, and a second printing layer may be disposed on the upper surface 120 of the cover window 100.

In an implementation, as illustrated in FIG. 2, the printing layer 140 may include one layer. In an implementation, the printing layer 140 may include two or more layers.

The printing layer 140 may include a printing layer or a light-blocking layer. For example, the printing layer 140 may be formed as a printing layer containing a color pigment, and the non-display area P2 located around the display area P1 may be seen as a particular color from the outside. In an implementation, the printing layer 140 may be formed as a light-blocking layer containing a black dye or pigment or a light absorber, and the non-display area P2 may be seen as black. In an implementation, pattern shapes such as logos or graphics may be displayed through the printing layer 140.

The housing 200 may be placed in a direction facing the cover window 100. The housing 200 may be coupled to the cover window 100 so as to accommodate the first adhesive layer 300, the polarizing plate 400, the display panel 500, the cushion member 600 and the second adhesive layer 700. The housing 200 may protect elements housed within the display device 10.

The housing 200 may include mounting surfaces 210 on which the side surfaces 110 of the cover window 100 may be mounted. The mounting surfaces 210 may be disposed at upper ends of sidewalls of the housing 200. For example, the mounting surfaces 210 may be disposed in areas of an inner surface of the housing 200 that contact the side surfaces 110 of the cover window 100. The mounting surfaces 210 may fit or complement the side surfaces 110 such that the side surfaces 110 of the cover window 100 may be mounted on the mounting surfaces 210. For example, the mounting surfaces 210 may have a shape corresponding to that of the side surfaces 110 such that the side surfaces 110 of the cover window 100 may be mounted on the mounting surfaces 210.

Referring to FIG. 2, the side surfaces 110 of the cover window 100 may curved outwardly on the cover window 100 in a convex shape, and the mounting surfaces 210 of the housing 200 may curved inwardly in the housing 200 in a concave shape. Therefore, the side surfaces 110 of the cover window 100 may be mounted on the mounting surfaces 210 of the housing 200.

In an implementation, the housing 200 may include a camera groove 220. The camera groove 220 may vertically (e.g., in a thickness direction) pass through the housing 200 to accommodate a camera. The camera groove 220 may be, e.g., circular or quadrilateral.

In an implementation, the housing 200 may include a battery groove 230. The battery groove 230 may vertically (e.g., in a thickness direction) pass through the housing 200 to accommodate a battery. The battery groove 230 may have a shape that allows the battery groove 230 to accommodate the battery and may be structured such that the battery can be easily inserted into or removed from the battery groove 230.

In an implementation, the housing 200 may include, e.g., metal, plastic, and/or glass.

In an implementation, as illustrated in FIGS. 1 and 2, the housing 200 may include one (e.g., monolithic) member and may provide a space for accommodating the first adhesive layer 300, the polarizing plate 400, the display panel 500, the cushion member 600 and the second adhesive layer 700. In an implementation, the housing 200 may include a plurality of members.

To attach the cover window 100 to the housing 200, the second adhesive layer 700 may be placed between the side surfaces 110 of the cover window 100 and the mounting surfaces 210 of the housing 200. The second adhesive layer 700 may be placed on at least part of the side surfaces 110 of the cover window 100 and the mounting surfaces 210 of the housing 200. For example, the printing layer 140 may be disposed on the lower surface 130 and the side surfaces 110 of the cover window 100 that correspond to the non-display area P2 of the cover window 100, and the second adhesive layer 700 may be disposed between the printing layer 140 (on the side surfaces 110 of the cover window 100) and the mounting surfaces 210 of the housing 200. In an implementation, the second adhesive layer 700 may be a double-sided adhesive tape.

The polarizing plate 400 may be disposed under the cover window 100, e.g., between the cover window 100 and the housing 200. The polarizing plate 400 may include a polarizer and a protective layer stacked on one surface or both surfaces of the polarizer. A transmission axis of the polarizer may be formed in a direction, and the polarizer may transmit light of a component parallel to the transmission axis. This characteristic may be formed by stretching polyvinyl alcohol (PVA)-based resin (i.e., a polarizer), which absorbed iodine, with strong tension. The PVA-based resin that forms the polarizer may include, e.g., polyvinyl acetate, which is a homopolymer of vinyl acetate, and/or copolymers of vinyl acetate and other copolymerizable monomers. The protective layer may protect and support the polarizer and may include, e.g., triacetyl cellulose (TAC). In an implementation, the protective layer may include, e.g., cellulose acetate butylene (CAB), polycarbonate (PC), polyvinyl chloride (PVC), polystyrene (PS), poly methyl methacrylate (PMMA), polyethylene (PE), or polyethylene terephthalate (PET).

To attach the polarizing plate 400 to the lower surface 130 of the cover window 100, the first adhesive layer 300 may be placed between the polarizing plate 400 and the cover window 100. The first adhesive layer 300 may be a transparent adhesive layer. For example, the first adhesive layer 300 may be an optically clear adhesive (OCA). In an implementation, the first adhesive layer 300 may also be an optically clear resin (OCR).

The display panel 500 may be disposed on a lower surface of the polarizing plate 400, e.g., between the polarizing plate 400 and the housing 200. The display panel 500 may display an image. The display panel 500 is not limited to a particular display panel. For example, the display panel 500 may be a self-emitting display panel such as an organic light-emitting display panel. In an implementation, the display panel 500 may be a non-emitting display panel such as a liquid crystal display (LCD) panel, an electrowetting display panel, an electrophoretic display panel, or a microelectromechanical system (MEMS) display panel. When a non-emitting display panel is used as the display panel 500, the display device 10 may include a backlight unit which provides light to the display panel 500.

The cushion member 600 may be disposed on a lower surface of the display panel 500, e.g., between the display panel 500 and the housing 200. The cushion member 600 may help protect members accommodated in the housing 200 from external impact. The cushion member 600 may be attached onto the lower surface of the display panel 500 by an adhesive or a double-sided tape.

The cushion member 600 may be made of a material having superior compressive stress and excellent impact- and vibration-absorbing capabilities. The cushion member 600 may be made of, e.g., acrylic resin, polyurethane, or latex.

Figure 3:
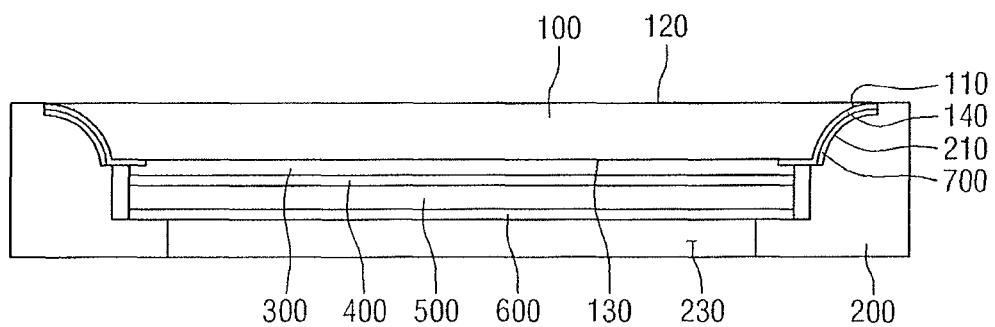
FIG. 3 illustrates a cross-sectional view of a modified example of the display device of FIG. 2.

FIG. 3 illustrates a cross-sectional view of a modified example of the display device 10 of FIG. 2.

A display device 11 of FIG. 3 is similar to the display device 10 of FIG. 2. However, the display device 11 of FIG. 3 is different from the display device 10 of FIG. 2 in that side surfaces 110 of a cover window 100 may be curved inwardly in a concave shape.

The housing 200 may include mounting surfaces 210 on which the side surfaces 110 of the cover window 100 may be mounted. The mounting surfaces 210 of the housing 200 may fit or complement the side surfaces 110 such that the side surfaces 110 of the cover window 100 may be mounted on the mounting surfaces 210 of the housing 200. For example, the mounting surfaces 210 may have a shape corresponding to that of the side surfaces 110 such that the side surfaces 110 of the cover window 100 may be mounted on the mounting surfaces 210.

Referring to FIG. 3, the side surfaces 110 of the cover window 100 may be curved inwardly in the cover window 100 in a concave shape, and the mounting surfaces 210 of the housing 200 may be curved outwardly on the housing 200 in a convex shape. Therefore, the side surfaces 110 of the cover window 100 may be mounted on the mounting surfaces 210 of the housing 200.

In an implementation, the side surfaces 110 may be curved only partially. In an implementation, each of the side surfaces 110 may have a fixed or constant radius of curvature. In an implementation, each of the side surfaces 110 may have a variable radius of curvature.

The display device 11 of FIG. 3 may include the cover window 100 having the side surfaces 110 curved inwardly in a concave shape, and may, like the display device 10 of FIG. 2, help reduce a dead space while maintaining a same adhesion area as a display device using another cover window.

Figure 4:
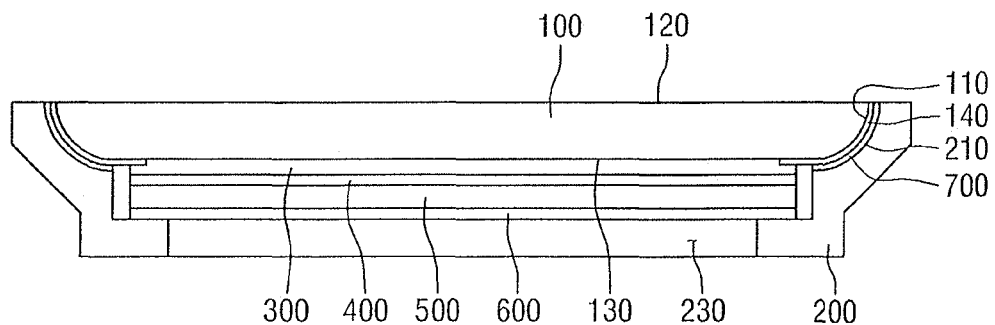
FIG. 4 illustrates a cross-sectional view of another modified example of the display device of FIG. 2.

FIG. 4 illustrates a cross-sectional view of another modified example of the display device 10 of FIG. 2.

A display device 12 of FIG. 4 is similar to the display device 10 of FIG. 2. However, the display device 12 of FIG. 4 is different from the display device 10 of FIG. 2 in that an area of a housing 200 that corresponds to a cover window 100 may have a larger cross-sectional area or dimension and that an area of the housing 200 that corresponds to a housing space may have a smaller cross-sectional area or dimension.

For example, the cover window 100 of the display device 12 of FIG. 4 may be the same size as the cover window 100 of the display device 10 of FIG. 2, and the housing 200 of the display device 12 of FIG. 4 may be relatively smaller than the housing 200 of the display device 10 of FIG. 2.

Figure 5:
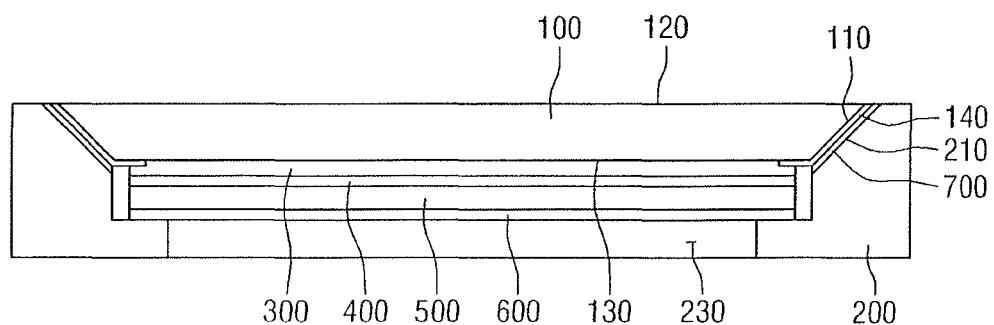
FIG. 5 illustrates a cross-sectional view of a display device according to another embodiment.

FIG. 5 illustrates a cross-sectional view of a display device 20 according to another embodiment.

Referring to FIG. 5, the display device 20 according to the current embodiment may include a cover window 100, a housing 200, a first adhesive layer 300, a polarizing plate 400, a display panel 500, a cushion member 600, and a second adhesive layer 700.

Each of side surfaces 110 of the cover window 100 may include a flat surface. For example, a whole of each of the side surfaces 110 may be flat. A thickness of the cover window 100 around each of the side surfaces 110 may be increased from the outside of the cover window 100 toward the inside. The side surfaces 110 may connect ends of an upper surface 120 and ends of a lower surface 130, respectively. The upper surface 120 may be wider than the lower surface 130, and the side surfaces 110 may slope downwardly or inwardly from the upper surface 120 toward the lower surface 130.

The housing 200 may include mounting surfaces 210 on which the side surfaces 110 of the cover window 100 may be mounted. The mounting surfaces 210 may be disposed at upper ends of sidewalls of the housing 200. For example, the mounting surfaces 210 may be disposed in areas of an inner surface of the housing 200 which contact the side surfaces 110 of the cover window 100.

The mounting surfaces 210 of the housing 200 may fit or complement the side surfaces 110 such that the side surfaces 110 of the cover window 100 may be mounted on the mounting surfaces 210. For example, the mounting surfaces 210 may have a shape corresponding to that of the side surfaces 110 such that the side surfaces 110 of the cover window 100 may be mounted on the mounting surfaces 210.

Referring to FIG. 5, the side surfaces 110 of the cover window 100 may be flat, and the mounting surfaces 210 of the housing 200 may also be flat. Therefore, the side surfaces 110 of the cover window 100 may be mounted on the mounting surfaces 210 of the housing 200.

In this case, the mounting surfaces 210 of the housing 200 and the side surfaces 110 of the cover window 100 may slope obliquely, and an undesirable dead space (e.g., a size of the dead space) may be reduced.

The first adhesive layer 300, the polarizing plate 400, the display panel 500, the cushion member 600 and the second adhesive layer 700 have been described above in detail, and thus a repeated description thereof is omitted.

As described above, the display device 20 according to the current embodiment may include the cover window 100 having the downward or inward sloping side surfaces 110. Therefore, the dead space may be reduced while the area of the side surfaces 110 may be maintained.

Figure 6:
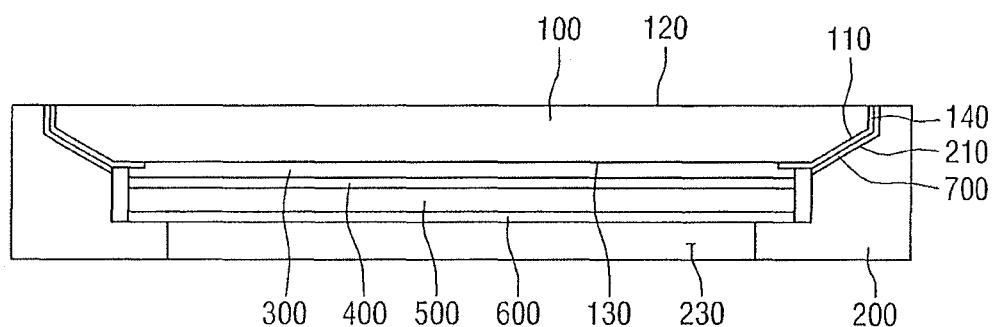
FIG. 6 illustrates a cross-sectional view of a modified example of the display device of FIG. 5.

FIG. 6 illustrates a cross-sectional view of a modified example of the display device 20 of FIG. 5.

A display device 21 of FIG. 6 is similar to the display device 20 of FIG. 5. However, the display device 21 of FIG. 6 is different from the display device 20 of FIG. 5 in that each of side surfaces 110 of a cover window 100 may include two flat surfaces that are not parallel to each other and may be bent or protrude outwardly on or from the cover window 100 in a convex shape.

Referring to FIG. 6, each of the side surfaces 110 of the cover window 100 may include two flat surfaces, and a point at which the two flat surfaces meet may lie or protrude outwardly on or from the cover window 100.

Mounting surfaces 210 of a housing 200 may fit or complement the side surfaces 110 of the cover window 100 such that the side surfaces 110 of the cover window 100 may be mounted on the mounting surfaces 210. For example, the mounting surfaces 210 may have a shape corresponding to that of the side surfaces 110 such that the side surfaces 110 of the cover window 100 may be mounted on the mounting surfaces 210 of the housing 200.

Each of the side surfaces 110 of the cover window 100 may include two flat surfaces and may be bent or protrude outwardly on or from the cover window 100 in a convex shape. In an implementation, each of the mounting surfaces 210 of the housing 200 may include two flat surfaces and may be bent or protrude inwardly on or in the housing 200 in a concave shape. Therefore, the side surfaces 110 of the cover window 100 may be mounted on the mounting surfaces 210 of the housing 200.

A first adhesive layer 300, a polarizing plate 400, a display panel 500, a cushion member 600 and a second adhesive layer 700 have been described above in detail, and thus a repeated description thereof is omitted.

Figure 7:
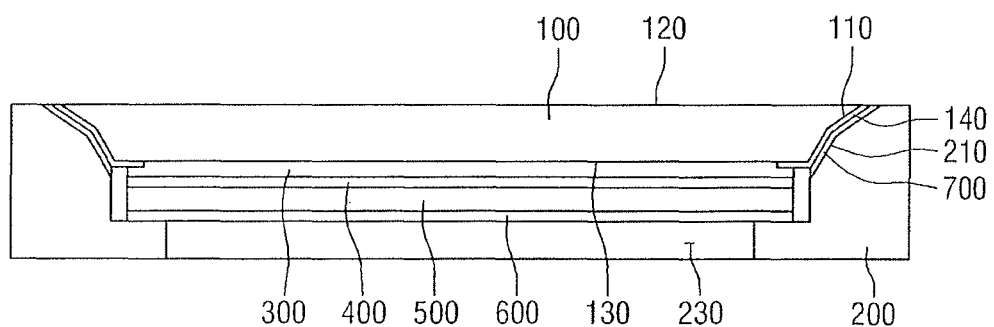
FIG. 7 illustrates a cross-sectional view of a modified example of the display device of FIG. 6.

FIG. 7 illustrates a cross-sectional view of a modified example of the display device 21 of FIG. 6.

A display device 22 of FIG. 7 is similar to the display device 21 of FIG. 6. However, the display device 22 of FIG. 7 is different from the display device 21 of FIG. 6 in that each of side surfaces 110 of a cover window 100 (that includes two flat surfaces not parallel to each other) may be bent or protrude inwardly in a concave shape.

Referring to FIG. 7, each of the side surfaces 110 of the cover window 100 may include two flat surfaces, and a point at which the two flat surfaces meet may lie or extend inwardly in the cover window 100.

Each of the side surfaces 110 of the cover window 100 may include two flat surfaces and may be bent or protrude inwardly in the cover window 100 in a concave shape. In an implementation, each of mounting surfaces 210 of a housing 200 may include two flat surfaces and may be bent or protrude outwardly on or from the housing 200 in a convex shape. Therefore, the side surfaces 110 of the cover window 100 may be mounted on the mounting surfaces 210 of the housing 200.

A first adhesive layer 300, a polarizing plate 400, a display panel 500, a cushion member 600 and a second adhesive layer 700 have been described above in detail, and thus a repeated description thereof is omitted.

Figure 8:
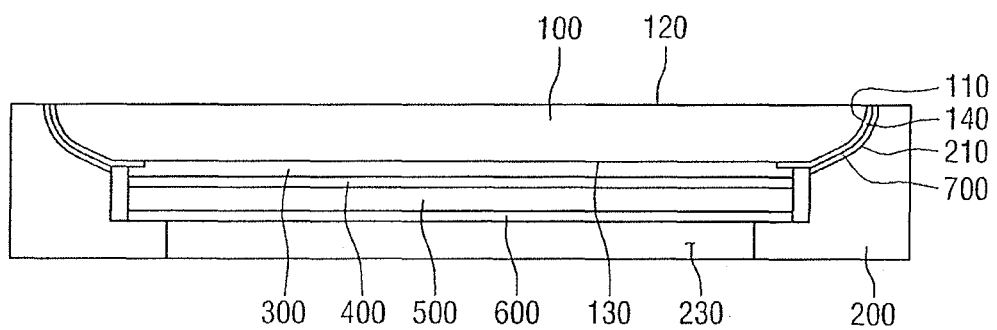
FIG. 8 illustrates a cross-sectional view of another modified example of the display device of FIG. 6.

FIG. 8 illustrates a cross-sectional view of another modified example of the display device 21 of FIG. 6.

A display device 23 of FIG. 8 is similar to the display device 21 of FIG. 6. However, the display device 23 of FIG. 8 is different from the display device 21 of FIG. 6 in that each of side surfaces 110 may include a curved area and a flat area.

Referring to FIG. 8, in an implementation, each of the side surfaces 110 of a cover window 100 may include a curved area and a flat area, and the curved area may be curved outwardly on the cover window 100 in a convex shape.

In an implementation, each of mounting surfaces 210 of a housing may include a curved area and a flat area, and the curved area may be curved inwardly in the housing 200 in a concave shape. Therefore, the side surfaces 110 of the cover window 100 may be mounted on the mounting surfaces 210 of the hosing 200.

A first adhesive layer 300, a polarizing plate 400, a display panel 500, a cushion member 600 and a second adhesive layer 700 have been described above in detail, and thus a repeated description thereof is omitted.

Figure 9:
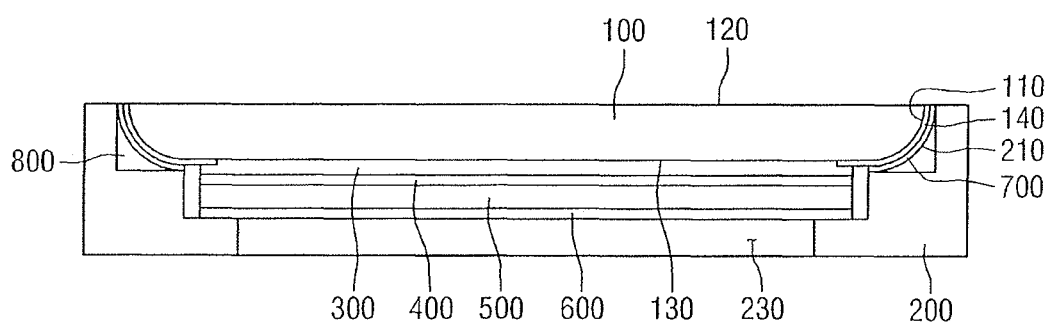
FIG. 9 illustrates a cross-sectional view of a display device according to another embodiment.

FIG. 9 illustrates a cross-sectional view of a display device 30 according to another embodiment.

Referring to FIG. 9, the display device 30 according to the current embodiment may include a cover window 100, a housing 200, a first adhesive layer 300, a polarizing plate 400, a display panel 500, a cushion member 600, a second adhesive layer 700, and mounting members 800.

As illustrated in FIG. 9, the whole of each of side surfaces 110 of the cover window 100 may be curved outwardly on the cover window 100 in a convex shape.

Each of the mounting members 800 may include a mounting surface 210 on which one of the side surfaces 110 of the cover window 100 may be mounted. The mounting surfaces 210 of the mounting members 800 may fit or complement the side surfaces 110 such that the side surfaces 110 of the cover window 100 may be mounted on the mounting surfaces 210. For example, the mounting surfaces 210 may have a shape corresponding to that of the side surfaces 110 such that the side surfaces 110 of the cover window 100 may be mounted on the mounting surfaces 210 of the mounting members 800.

Other surfaces of each of the mounting members 800 (excluding, e.g., opposite or tangential to the mounting surface 210) may be flat, and the mounting members 800 may be attached to an inner surface of the housing 200. For example, the mounting members 800 may be attached to the inner surface of the housing 200 by an adhesive or an adhesive tape.

Referring to FIG. 9, each of the mounting members 800 may include a flat side surface and a flat lower surface, and the inner surface of the housing 200 may have a shape corresponding to that of the flat side and lower surfaces of each of the mounting members 800.

In an implementation, each of the side surfaces 110 may be curved only partially. In an implementation, each of the side surfaces 110 may be curved inwardly in the cover window 100 in a concave shape. In an implementation, each of the side surfaces 110 may have a fixed or constant radius of curvature. In an implementation, each of the side surfaces 110 may have a variable radius of curvature.

As described above, the display device 30 according to the current embodiment may include the mounting members 800 having the at least partially curved side surfaces 110. Therefore, a dead space may be reduced while the area of the side surfaces 110 is maintained.

Figure 10:
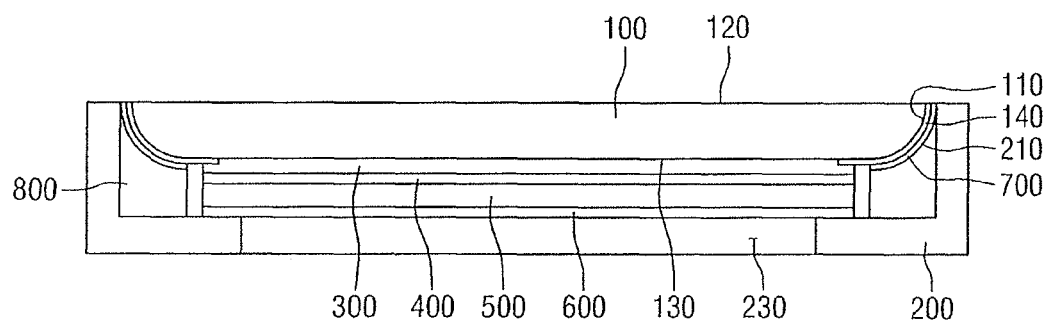
FIG. 10 illustrates a cross-sectional view of a modified example of the display device of FIG. 9.

FIG. 10 illustrates a cross-sectional view of a modified example of the display device 30 of FIG. 9.

A display device 31 of FIG. 10 is similar to the display device 30 of FIG. 9. However, the display device 31 of FIG. 10 is different from the display device 30 of FIG. 9 in that a housing 200 may have a uniform lateral thickness and that mounting members 800 may extend downwardly along an inner surface of the housing 200.

Referring to FIG. 10, the housing 200 may have a uniform thickness, and may have flat inner side surfaces and a flat inner bottom surface. Each of the mounting members 800 may include a flat side surface and a flat lower surface such that the flat side and lower surfaces of each of the mounting members 800 may be attached to the flat inner side and bottom surfaces of the housing 200. In this case, a contact area between each of the mounting members 800 and the housing 200 may be relatively larger than that in the display device 30 of FIG. 9. Therefore, the mounting members 800 may be attached to the housing 200 more securely.

Figure 11:
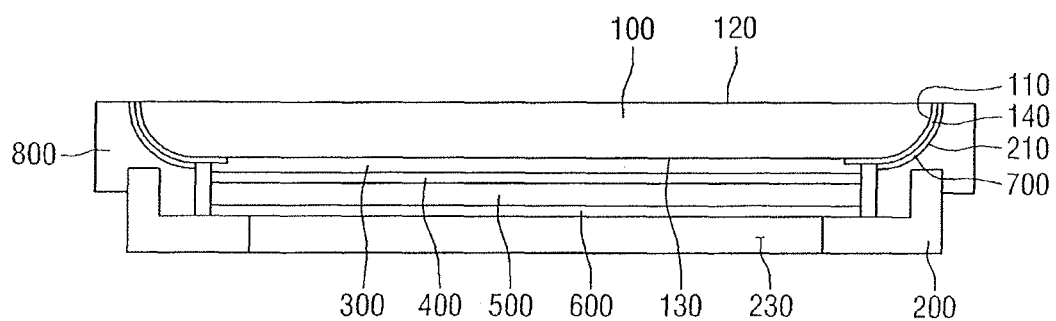
FIG. 11 illustrates a cross-sectional view of another modified example of the display device of FIG. 9.

FIG. 11 illustrates a cross-sectional view of another modified example of the display device 30 of FIG. 9.

A display device 32 of FIG. 11 is similar to the display device 30 of FIG. 9. However, the display device 32 of FIG. 11 is different from the display device 30 of FIG. 9 in that mounting members 800 may extend beyond an inner surface of a housing 200 to an outer surface of the housing 200.

Referring to FIG. 11, each of the mounting members 800 may cover three surfaces of the housing 200. For example, each of the mounting members 800 may be attached to the housing 200 such that the mounting members 800 may contact the whole of the inner surface of the housing 200, a part of the outer surface of the housing 200, and a surface adjacent to the inner surface and the outer surface of the housing 200. In this case, a contact area between each of the mounting members 800 and the housing 200 may relatively larger than those in the display device 30 of FIG. 9 and the display device 31 of FIG. 10, and the mounting members 800 can be attached to the housing 200 more securely.

Figure 12:
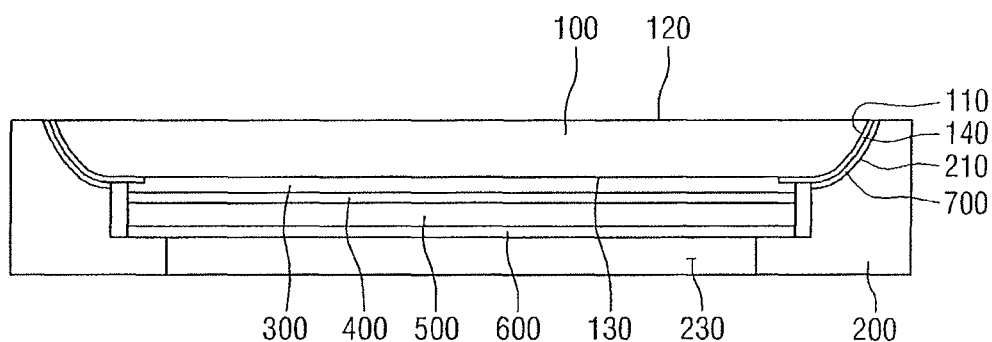
FIG. 12 illustrates a cross-sectional view of a modified example of the display device 10 of FIG. 2.

FIG. 12 illustrates a cross-sectional view of a modified example of the display device 10 of FIG. 2.

A display device 13 of FIG. 12 is similar to the display device 10 of FIG. 2. However, the display device 13 of FIG. 12 is different from the display device 10 of FIG. 2 in that the radius of curvature of each of the side surfaces 110 may be reduced from the outside toward the inside.

By way of summation and review, the mounting surface of a housing may have a predetermined area in order to secure sufficient adhesion to have the cover window mounted thereon, and a dead space may be created in an area in which the mounting surface is disposed.

In some display devices, the dead space may be located in the area corresponding to the mounting surface. Such a configuration may reduce design freedom, may reduce an area utilization rate (because a proportion of a display area in the entire area of the display device may be low due to the unusable dead space), and may increase an overall size of the display device set.

Display devices according to embodiments may increase a display area by reducing a dead space.

The embodiments may provide a display device that can secure a larger display area by reducing a dead space.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
a housing that comprises sidewalls and mounting surfaces at upper ends of the sidewalls;
a display panel housed in the housing; and
a cover window on the display panel,
wherein the cover window includes:
an upper surface that faces outwardly in a direction in which light is emitted, a lower surface opposite to the upper surface, the lower surface being narrower than the upper surface, and side surfaces that slope inwardly from ends of the upper surface to ends of the lower surface, wherein the side surfaces of the cover window are mounted on the mounting surfaces of the housing, and each of the side surfaces of the cover window includes at least two flat surfaces not parallel to each other with each of the at least two flat surfaces making contact with the mounting surfaces.

2. The display device as claimed in claim 1, further comprising a polarizing plate between the display panel and the cover window.

3. The display device as claimed in claim 1, wherein a thickness of the cover window increases from an outer side thereof toward an interior thereof.

4. The display device as claimed in claim 1, further comprising a first adhesive layer between the cover window and the display panel.

5. The display device as claimed in claim 4, wherein the first adhesive layer includes an optically clear adhesive.

6. The display device as claimed in claim 1, further comprising a cushion member between a lower surface of the display panel and an inner surface of the housing.

7. The display device as claimed in claim 1, wherein the mounting surfaces complement the side surfaces.

8. The display device as claimed in claim 1, further comprising a second adhesive layer between the mounting surfaces and the side surfaces.

9. The display device as claimed in claim 1, wherein the mounting surfaces of the housing have a shape corresponding to a shape of the side surfaces of the cover window, and wherein the mounting surfaces of the housing are disposed in a non-display area.

10. A display device, comprising:

a housing that comprises sidewalls and mounting surfaces at upper ends of the sidewalls, each mounting surface of the housing including at least two flat surfaces not parallel to each other;

a display panel housed in the housing; and a cover window on the display panel, wherein the cover window includes:

an upper surface that faces outwardly in a direction in which light is emitted, a lower surface opposite to the upper surface, the lower surface being narrower than the upper surface, and side surfaces that slope inwardly from ends of the upper surface to ends of the lower surface, each side surface of the cover window including at least two flat surfaces not parallel to each other that conform to a shape of the mounting surface of the housing, wherein the side surfaces of the cover window are mounted on the mounting surfaces of the housing.

* * * * *